United States Patent
Wada

(10) Patent No.: US 10,022,866 B2
(45) Date of Patent: Jul. 17, 2018

(54) ROBOT CONTROL DEVICE

(71) Applicant: Kobe Steel, Ltd., Hyogo (JP)

(72) Inventor: Takashi Wada, Kobe (JP)

(73) Assignee: Kobe Steel, Ltd., Hyogo (JP)

(*) Notice: Subject to any disclaimer, the term of this patent is extended or adjusted under 35 U.S.C. 154(b) by 111 days.

(21) Appl. No.: 15/315,318

(22) PCT Filed: May 26, 2015

(86) PCT No.: PCT/JP2015/065108
§ 371 (c)(1),
(2) Date: Nov. 30, 2016

(87) PCT Pub. No.: WO2015/186572
PCT Pub. Date: Dec. 10, 2015

(65) Prior Publication Data
US 2017/0190049 A1    Jul. 6, 2017

(30) Foreign Application Priority Data
Jun. 2, 2014 (JP) .................. 2014-114086

(51) Int. Cl.
*B25J 9/00* (2006.01)
*B25J 9/16* (2006.01)
*B25J 13/08* (2006.01)

(52) U.S. Cl.
CPC ........... *B25J 9/1641* (2013.01); *B25J 13/088* (2013.01); *G05B 2219/41443* (2013.01)

(58) Field of Classification Search
USPC ......... 700/170, 245–264; 318/561, 567–569, 318/571, 600; 623/24, 47, 53; 901/1, 2,
(Continued)

(56) References Cited

U.S. PATENT DOCUMENTS 5,455,497 A * 10/1995 Hirose ................ B62D 57/032
                                                    180/8.1
6,341,244 B1 * 1/2002 Papiernik ............... G05B 19/19
                                                    700/159
(Continued)

FOREIGN PATENT DOCUMENTS

JP    H01-249268 A    10/1989
JP    H07-308780 A    11/1995
(Continued)

OTHER PUBLICATIONS

International Search Report issued in PCT/JP2015/065108; dated Aug. 25, 2015.
(Continued)

*Primary Examiner* — Jonathan L Sample
(74) *Attorney, Agent, or Firm* — Studebaker & Brackett PC

(57) ABSTRACT

A control device of a robot for controlling the angle of a joint of the robot that is driven by a motor. The control device is equipped with: a joint angle command-calculating unit for calculating a joint angle command value; an axial force torque-calculating unit for calculating the axial force torque generated in the joint axis; an elastic deformation-compensating unit for calculating a motor command angle by adding a joint deflection, which is calculated from the axial force torque and a joint spring constant, to the joint angle command value; a stopping position-detecting unit for detecting the angle of the motor when the robot contacts an external structure; and a command angle-switching unit for outputting the motor angle detected by the stopping position-detecting unit instead of the joint angle command value when the stopping position-detecting unit outputs the angle of the motor.

6 Claims, 9 Drawing Sheets

(58) Field of Classification Search
USPC .......................................... 901/8, 30, 41, 46
See application file for complete search history.

(56) References Cited

U.S. PATENT DOCUMENTS

| | | | | |
|---|---|---|---|---|
| 6,774,598 | B1* | 8/2004 | Kohler | G05B 19/41 318/561 |
| 6,969,965 | B2* | 11/2005 | Takenaka | B62D 57/02 318/568.1 |
| 7,395,606 | B2* | 7/2008 | Crampton | B25J 13/088 33/503 |
| 8,335,591 | B2* | 12/2012 | Takahashi | B25J 9/1633 414/5 |
| 8,419,804 | B2* | 4/2013 | Herr | A61F 2/60 623/24 |
| 8,512,415 | B2* | 8/2013 | Herr | A61F 2/60 623/24 |
| 8,855,821 | B2* | 10/2014 | Seo | B25J 9/0006 700/250 |
| 9,539,059 | B2* | 1/2017 | Fukushima | G05B 15/02 |
| 2003/0033029 | A1* | 2/2003 | Kohler | G05B 19/4103 700/13 |
| 2005/0021176 | A1* | 1/2005 | Takenaka | B62D 57/02 700/245 |
| 2006/0173578 | A1* | 8/2006 | Takenaka | B62D 57/032 700/245 |
| 2007/0164695 | A1* | 7/2007 | Hagihara | B25J 9/1602 318/568.11 |
| 2007/0299642 | A1* | 12/2007 | Kondo | G06F 17/5009 703/6 |
| 2008/0009771 | A1* | 1/2008 | Perry | B25J 9/0006 600/587 |
| 2010/0113980 | A1* | 5/2010 | Herr | A61F 2/60 600/587 |
| 2011/0082566 | A1* | 4/2011 | Herr | A61F 2/60 623/24 |
| 2011/0098856 | A1* | 4/2011 | Yoshiike | B62D 57/032 700/246 |
| 2011/0270443 | A1* | 11/2011 | Kamiya | G05B 19/401 700/245 |
| 2012/0259463 | A1* | 10/2012 | Orita | B25J 9/1648 700/245 |
| 2013/0345872 | A1* | 12/2013 | Brooks | B25J 9/0087 700/259 |
| 2014/0222186 | A1* | 8/2014 | Wada | B25J 9/1641 700/114 |
| 2014/0222207 | A1* | 8/2014 | Bowling | A61B 34/32 700/261 |
| 2015/0105905 | A1* | 4/2015 | Nishida | B25J 9/1641 700/254 |

FOREIGN PATENT DOCUMENTS

| | | |
|---|---|---|
| JP | H11-320477 A | 11/1999 |
| JP | 2001-290541 A | 10/2001 |
| JP | 2013-244540 A | 12/2013 |
| JP | 2013-248683 A | 12/2013 |

OTHER PUBLICATIONS

Written Opinion issued in PCT/JP2015/065108; dated Aug. 25, 2015.

* cited by examiner

WORKPIECE CONTACT TIME

WORKPIECE CONTACT TIME

ROBOT CONTROL DEVICE

TECHNICAL FIELD

The present invention relates to a robot control device.

BACKGROUND ART

An industrial robot is an example of a robot whose position is determined by varying its joint angle. Examples of a welding operation using a welding robot, which is a type of industrial robot, include an operation called touch sensing that senses the position of a workpiece to be welded. Touch sensing is a sensing operation which involves moving a welding robot while applying a voltage to a welding torch, and detecting a position at which a welding wire of the welding torch contacts the workpiece (i.e., a position at which electrical conduction between the workpiece and the welding wire is detected) as a workpiece position.

The touch sensing normally detects the position of the workpiece on the basis of the position of the robot (i.e., the motor angle for each joint of the robot) when the contact with the workpiece is detected. However, there is a delay between detection of the contact with the workpiece and acquisition of information about the position of the robot. If the welding wire is moved at a high speed and brought into contact with the workpiece, the welding wire is significantly moved even during the delay time. As a result, a position which is displaced from the actual workpiece position is detected as the position of the workpiece.

Therefore, when the welding wire is brought close to the workpiece, the welding robot is operated at a low speed to allow the welding wire to move at a low speed. However, operating the welding robot at a low speed is disadvantageous in that it takes time to perform the sensing.

As solutions to the problems described above, Patent Literature (PTL) 1 discloses a workpiece detecting method for an automatic welding apparatus, and PTL 2 discloses a wire touch sensing method for a welding robot.

The workpiece detecting method disclosed in PTL 1 is a workpiece detecting method for an automatic welding apparatus. The automatic welding apparatus includes conduction detecting means for selectively applying a welding voltage and a sensing voltage to a consumable electrode type welding torch, and detecting, during application of the sensing voltage, a state of electrical conduction between a consumable electrode protruding from the welding torch and a workpiece. The workpiece detecting method includes bringing the welding torch close to the workpiece at a high speed while applying the sensing voltage to the welding torch, stopping the motion of the welding torch in response to a conduction detection output from the conduction detecting means, detaching the welding torch at a low speed in accordance with the conduction detection output, detecting by the conduction detecting means the detachment of the consumable electrode from the workpiece, and using a detachment detection output from the conduction detecting means as a control signal for the automatic welding apparatus.

The wire touch sensing method disclosed in PTL 2 includes moving a welding wire while applying a voltage thereto, moving the wire backward at a low speed upon detection of a signal indicating a short circuit in the wire, and determining the position of detecting a short-circuit cancellation signal as a position at which an object to be welded is actually located.

In the techniques disclosed in these patent literatures, the welding wire is brought into contact with the workpiece while a voltage is applied to the welding torch, and the robot is stopped after detection of contact with the workpiece. Then, the welding wire is moved at a low speed to be detached from the workpiece, and the position of the workpiece is detected on the basis of the robot position when the welding wire and the workpiece are brought out of conduction.

In this method, after the welding wire is brought close to the workpiece at a high speed and then temporarily stopped, the workpiece position is detected during the subsequent detachment motion. Thus, the workpiece position can be accurately detected in a short sensing time.

As a technique for stopping the welding wire that has been brought close to the workpiece at a high speed, PTL 3 discloses an acceleration/deceleration method for an industrial machine.

The acceleration/deceleration method disclosed in PTL 3 is an industrial machine acceleration/deceleration method for controlling acceleration and deceleration of moving means in an industrial machine. The industrial machine includes a machine base whose relationship with an installation location is approximated to a first spring vibration system; and a control object having the moving means whose relationship with the machine base is approximated to a second spring vibration system, the moving means being configured to move over the machine base in response to a force generated by motion of an actuator secured onto the machine base. To accelerate and decelerate the moving means with a constant acceleration, a velocity command is generated which makes the acceleration time and the deceleration time equal to a period which is an integral multiple of the natural vibration period of the machine base determined on the basis of the sum of the masses of the machine base and the actuator and the spring constant of the first spring vibration system, and a motion command that causes the moving means to move on the basis of the velocity command is output to the actuator.

By generating a deceleration path using the acceleration/deceleration method based on the natural vibration period, the industrial machine can be stopped without vibration.

CITATION LIST

Patent Literature

PTL 1: Japanese Unexamined Patent Application Publication No. 1-249268

PTL 2: Japanese Unexamined Patent Application Publication No. 7-308780

PTL 3: Japanese Unexamined Patent Application Publication No. 2001-290541

SUMMARY OF INVENTION

Technical Problem

If the robot is simply abruptly stopped upon contact of the welding wire with the workpiece as in the techniques disclosed in PTLs 1 and 2, not only the welding torch and the welding wire but also the entire robot vibrates. This has been proven in practice. If the welding wire is detached from the workpiece while the robot is vibrating, the position of the workpiece cannot be accurately detected. This means that once the robot starts to vibrate, the welding wire cannot be detached from the workpiece until the robot stops vibrating. This increases the time required for sensing.

As a solution to this problem, the technique disclosed in PTL 3 may be used, in which the robot is stopped without vibration. However, the technique disclosed in PTL 3 is a technique applicable to the case where a stop position for stopping the robot is determined in advance. That is, if the stop position is determined in advance, a deceleration path can be generated toward the stop position. However, the deceleration path cannot be generated if the stop position is not determined in advance, as in the case of the wire touch sensing in which the stop position is determined upon contact with the workpiece.

Additionally, in the case of an apparatus having a plurality of joints, such as a welding robot, vibration generated at each joint is transmitted to other joints and becomes very complex. That is, the vibration cannot be suppressed simply by taking into account the natural vibration period. Therefore, even when the technique disclosed in PTL 3 is applied to the wire touch sensing, it is not possible to suppress vibration generated when the robot is stopped.

The present invention has been made in view of the problems described above. An object of the present invention is to provide a robot control device that can quickly stop a robot at a desired position while suppressing vibration of the robot.

Solution to Problem

To solve the problems described above, a robot control device according to the present invention takes the following technical measures. That is, a robot control device according to the present invention is a control device that controls an angle of a joint of a robot driven by a motor. The robot control device includes a joint-angle command calculating unit configured to calculate and output a first angle command indicating an angle of the joint for causing the robot to perform a desired motion; an axial-force torque calculating unit configured to calculate, upon receipt of the first angle command, a first axial force torque on the basis of a kinetic model of the robot, the first axial force torque being generated on a joint axis of the robot operating in accordance with the received first angle command; an elastic deformation compensation unit configured to add the amount of deflection in the joint calculated from the first axial force torque and a spring constant representing stiffness of the joint of the robot to the angle of the joint indicated by the first angle command received by the axial-force torque calculating unit, to calculate and output a motor command angle indicating a rotation angle of the motor; a stop position detecting unit configured to detect and output, as a motor detection angle, an angle of the motor when the robot contacts an external structure; and a command angle switching unit configured to output, when the stop position detecting unit outputs the angle of the motor, the angle of the motor detected by the stop position detecting unit as a second angle command indicating the angle of the joint, instead of the first angle command output from the joint-angle command calculating unit.

Upon receipt of the second angle command, the axial-force torque calculating unit may calculate a second axial force torque on the basis of the kinetic model of the robot, the second axial force torque being generated on the joint axis of the robot operating in accordance with the received second angle command. The elastic deformation compensation unit may add the second axial force torque and the amount of deflection in the joint to the angle of the joint indicated by the second angle command received by the axial-force torque calculating unit to calculate the motor command angle.

The robot control device may further include an inverse elastic deformation compensation unit configured to subtract, from the motor detection angle, the amount of deflection in the joint calculated from the first or second axial force torque output from the axial-force torque calculating unit and the spring constant representing stiffness of the joint to calculate a corrected motor detection angle. The stop position detecting unit may detect and output the corrected motor detection angle, instead of the motor detection angle.

The robot control device may further include an FF torque calculating unit configured to calculate, upon receipt of the first angle command, an FF torque on the basis of kinetic models of the robot and the motor, the FF torque being generated in the motor when the joint operates in accordance with the first angle command; a position/speed control unit configured to output, in accordance with the output motor command angle, a torque command indicating a torque to be generated in the motor; and a torque control unit configured to control the motor in accordance with a command value obtained by adding the FF torque to the torque command output from the position/speed control unit.

Advantageous Effects of Invention

By using the robot control device according to the present invention, it is possible to quickly stop the robot at a desired position while suppressing vibration of the robot.

DESCRIPTION OF EMBODIMENTS

Figure 1:
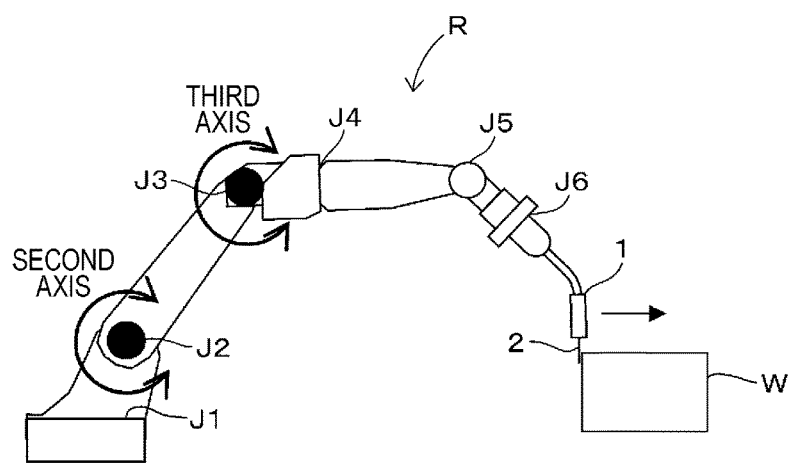
FIG. 1 is a schematic diagram illustrating an overall structure of a welding robot which is an articulated robot according to an embodiment of the present invention.

Hereinafter, a robot control device according to an embodiment of the present invention will be described in detail on the basis of the drawings.

The same components common to the embodiments described below are assigned the same reference numerals and names. Accordingly, the description of the components assigned the same reference numerals and names will not be repeated.

First Embodiment

With reference to FIGS. 1 to 6 and FIGS. 7A to 7D, a control device 10 for controlling a robot R according to a first embodiment of the present invention will be described.

First, how the control device 10 of the present embodiment generally controls the robot R will be described. The robot R controlled by the control device 10 of the present embodiment is a robot that has at least one joint J, and operates (or changes its position) when the angle of the joint J is changed by driving (rotating) a motor M. The control device 10 operates the robot R by controlling the rotation of the motor M to change the angle of the joint.

The present embodiment illustrates an articulated welding robot R as the robot R whose motion is controlled by the control device 10.

FIG. 1 is a schematic diagram illustrating an overall structure of the welding robot R which is an articulated robot. The welding robot R (hereinafter simply referred to as "robot R") is, for example, a six-axis vertical articulated robot that has six joints J (J1 to J6) and performs arc welding with a welding wire 2 fed from a welding torch 1 provided on a distal-end shaft. For example, the robot R performs a motion (weaving motion) of tilting the welding wire 2 at a predetermined amplitude and frequency while moving the welding torch 1 along the direction of a welding line that connects a welding start point and a welding end point. Such a motion of the robot R is controlled by the control device 10, and the motion is taught by the control device 10 in advance.

Figure 2:
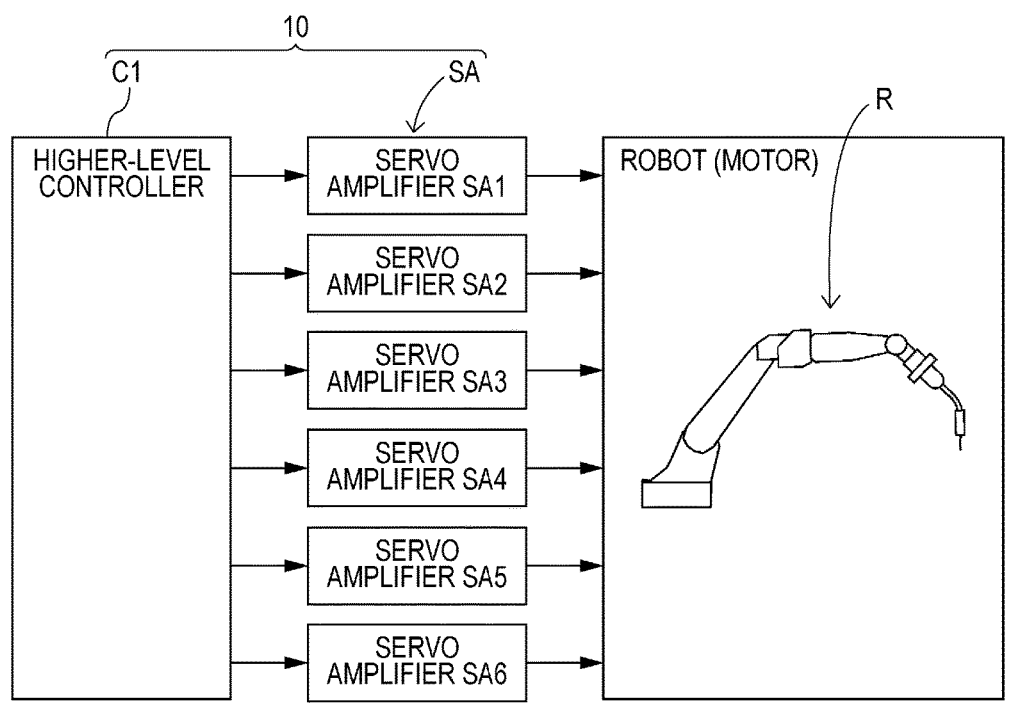
FIG. 2 is a block diagram illustrating a general configuration of a control device according to an embodiment of the present invention.

FIG. 2 is a block diagram illustrating a general configuration of the control device 10 and a general configuration of servo amplifiers SA (SA1 to SA6). As illustrated in FIG. 2, the control device 10 for the robot R mainly includes a higher-level controller C1 that controls the motion of the entire robot R, and the servo amplifiers SA (SA1 to SA6) that control the operation of the motors M (M1 to M6) for the joints J (J1 to J6) of the robot. The higher-level controller C1, the servo amplifiers SA, and the robot R are connected to each other by communication lines, through which information is transmitted.

Figure 3:
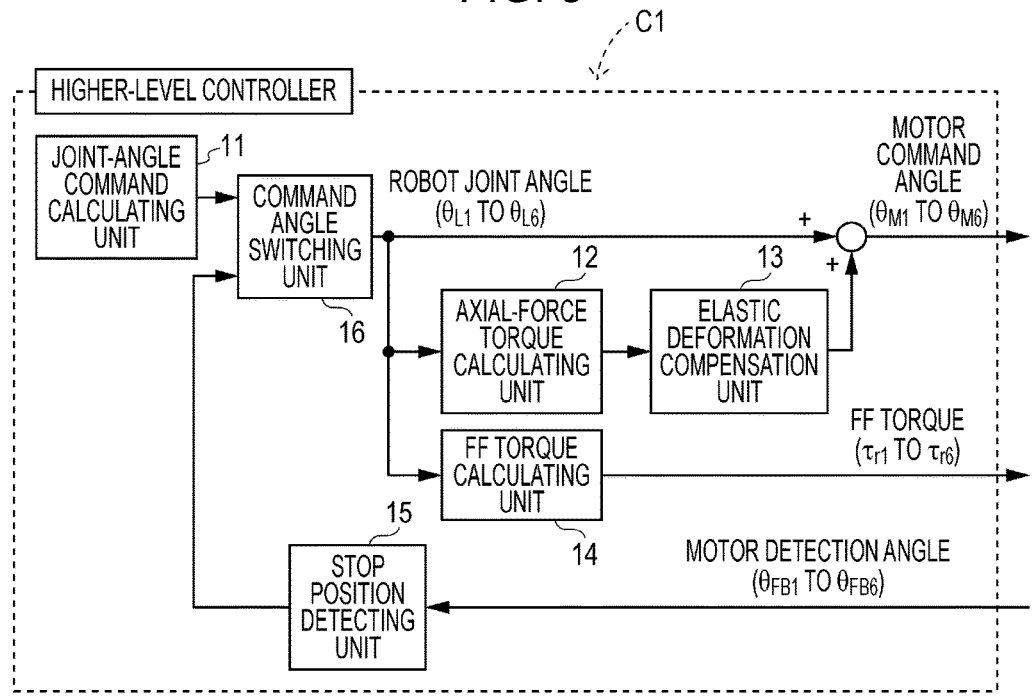
FIG. 3 is a block diagram illustrating a general configuration of a higher-level controller according to a first embodiment of the present invention.
Figure 4:
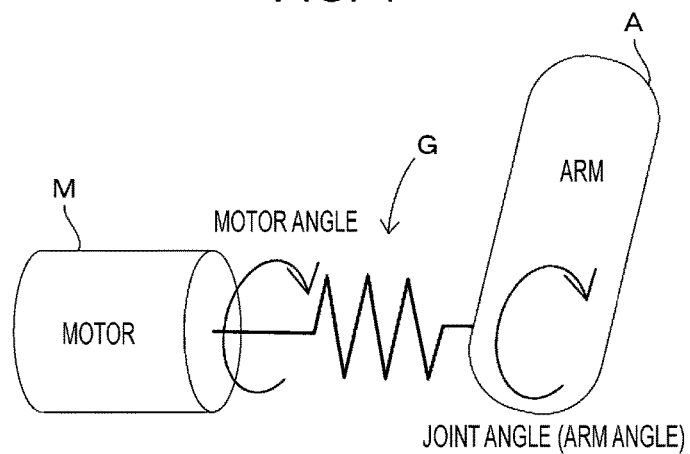
FIG. 4 schematically illustrates a deflection element (elastic deformation element) at a joint of a robot according to the present embodiment.

With reference to FIGS. 3 and 4, the higher-level controller C1 and the servo amplifiers SA (SA1 to SA6) will be described. FIG. 3 is a block diagram illustrating a general configuration of the higher-level controller C1.

The higher-level controller C1 illustrated in FIG. 3 generates command values for the servo amplifiers SA (described below) such that the robot R moves in accordance with prestored motion information (generally referred to as "teaching data") of the robot R. The higher-level controller C1 includes a joint-angle command calculating unit 11, an axial-force torque calculating unit 12, an elastic deformation compensation unit 13, an FF torque calculating unit 14, a stop position detecting unit 15, and a command angle switching unit 16.

The joint-angle command calculating unit 11 calculates and outputs a joint-angle command value indicating the angle of each joint J to cause the robot R to perform a desired motion. On the basis of the prestored motion information (teaching data) of the robot R, the joint-angle command calculating unit 11 performs inverse transformation from the position of the welding torch 1 at the distal end of the robot R, thereby generating an angle command value for each joint J of the robot R (joint-angle command value $\theta_L$) as a first angle command. The motion information of the robot R may be the angle of each joint J of the robot R. In this case, the joint-angle command calculating unit 11 uses the angle of each joint J, which is the motion information, as the joint-angle command value for the joint J without changing it.

As a motor command angle $\theta_M$, which is a command angle for moving the motor M, the joint-angle command calculating unit can output the generated joint-angle command value $\theta_L$ to the servo amplifier SA (described below) without changing it. That is, the motor command angle $\theta_M$ may be simply made equal to the joint angle (arm angle) of the robot R, but due to the presence of a deflection element (elastic deformation element), such as that illustrated in FIG. 4, at the joint J of the robot R, the motor command angle $\theta_M$ is not equal to ($\neq$) the robot joint angle in practice. For accurate motion of the robot R, compensation is performed to compensate for error caused by deflection (elastic deformation). This compensation is referred to as elastic deformation compensation.

FIG. 4 schematically illustrates a deflection element (elastic deformation element) at the joint J of the robot R. Since a speed reducer G between the rotating shaft of the motor M and an arm A is present as an elastic deformation element, the motor angle is not necessarily equal to the joint angle.

The axial-force torque calculating unit 12 and the elastic deformation compensation unit 13 that perform the elastic deformation compensation will now be described.

Upon receipt of the joint-angle command value $\theta_L$, which is the first angle command, the axial-force torque calculating unit 12 calculates a torque $\tau_L$ as a first axial force torque on the basis of a kinetic model of the robot R. The torque $\tau_L$ is generated on the joint axis of the robot R that operates in accordance with the received joint-angle command value $\theta_L$. Specifically, from the joint-angle command value $\theta_L$ for the robot R, the axial-force torque calculating unit 12 calculates the torque $\tau_L$, which is an axial force torque generated at the joint J, using the kinetic model of the robot R represented by the following equation (1), and outputs the calculated torque $\tau_L$.

[Equation 1]

$$J(\theta_L)\cdot\ddot{\theta}_L + C(\theta_L, \dot{\theta}_L) + G(\theta_L) + F_M(\dot{\theta}L) = \tau_L \quad \text{equation (1)}$$

$\theta_L$: robot joint-angle command value
$J(\theta_L)\cdot\ddot{\theta}_L$: inertial force on arm
$C(\theta_L, \dot{\theta}_L)$: centrifugal and Coriolis forces on arm
$G(\theta_L)$: gravity on arm
$F_M(\dot{\theta}_L)$: frictional force on arm The elastic deformation compensation unit 13 adds the amount of deflection in the joint J calculated from the torque $\tau_L$ and a spring constant representing the stiffness of the joint J of the robot R to the angle of the joint J indicated by the joint-angle command value $\theta_L$ received by the axial-force torque calculating unit 12 to calculate and output the motor command angle indicating the rotation angle of the motor M. Specifically, the elastic deformation compensation unit 13 receives the torque $\tau_L$ from the axial-force torque calculating unit 12, determines the amount of deflection ($\tau_L/K$) in the joint J on the basis of the received torque $\tau_L$ as shown in the following equation (2), calculates the motor command angle $\theta_M$ indicating the rotation angle of the motor M using the determined amount of deflection in the joint J, and outputs the calculated motor command angle $\theta_M$.

[Equation 2]

$$\theta_M = \theta_L + \tau_L/K \quad \text{equation (2)}$$

$\theta_M$: motor command angle
K: spring constant related to deflection in joint The elastic deformation compensation unit 13 outputs and transmits, to the servo amplifier SA (described below), the motor command angle $\theta_M$ for the motor M of each joint J calculated by equation (2). For example, if the robot R is a six-axis articulated robot having six joints J, the elastic deformation compensation unit 13 outputs six motor command angles $\theta_{M1}$ to $\theta_{M6}$ for the motors M1 to M6 of the six joints J (J1 to J6) on the first to sixth axes to the servo amplifiers SA1 to SA6 (described below).

For accurate motion of the robot R, two-degree-of-freedom control which combines feedback (FB) control with feedforward (FF) control is used, as well as the calculation of axial force torque and the elastic deformation compensation described above. The feedback control refers to control performed on the basis of a comparison between a command value, such as the motor command angle θM, and a state (e.g., measured joint angle) of an object to be controlled, such as the robot R. The feedforward control refers to control in which a command value given by using a model of the robot R, which is an object to be controlled, is used to predict an input to the motor M for operating the robot R in accordance with the command value.

An advantage of the two-degree-of-freedom control is that the feedforward control based on the model can compensate for a delay in feedback control that controls the robot motion according to the command value. The two-degree-of-freedom control can make the motor M operate in accordance with the command value. What is required here is to calculate, on the basis of the model of the robot R, an input for operating the robot R in accordance with the command value, that is, a driving torque $\tau_r$ of the motor M.

Upon receipt of the joint-angle command value $\theta_L$, which is the first angle command, the FF torque calculating unit 14 calculates, on the basis of kinetic models of the robot R and the motor M, an FF torque generated in the motor M when the robot R operates in accordance with the calculated joint-angle command value $\theta_L$. Specifically, on the basis of the kinetic model of the robot R and the kinetic model of the motor M, the FF torque calculating unit 14 calculates the driving torque $\tau_r$ (referred to as "FF torque $\tau_r$") of the motor M for operating the robot R in accordance with the command value by using, for example, the following equations (3) to (5) and outputs the calculated FF torque $\tau_r$.

[Equation 3]

$$J(\theta_L)\cdot\ddot{\theta}_L + C(\theta_L, \dot{\theta}_L) + G(\theta_L) + F_M(\dot{\theta}_L) = \tau_L \quad \text{equation (3)}$$

$\theta_L$: robot joint-angle command value
$J(\theta_L)\cdot\ddot{\theta}_L$: inertial force on arm
$C(\theta_L, \dot{\theta}_L)$: centrifugal and Coriolis forces on arm
$G(\theta_L)$: gravity on arm
$F_M(\dot{\theta}_L)$: frictional force on arm

[Equation 4]

$$J_M\ddot{\theta}_M + F_M(\dot{\theta}_M) = \tau_M \quad \text{equation (4)}$$

$\theta_M$: motor command angle
$J_M\ddot{\theta}_M$: inertial force on motor
$F_M(\dot{\theta}_M)$: frictional force on arm

[Equation 5]

$$\tau_r = \tau_L + \tau_M \quad \text{equation (5)}$$

The FF torque calculating unit 14 outputs and transmits, to the servo amplifier SA (described below), the FF torque $\tau_r$ calculated by equations (3) to (5) and required for operating each motor M in accordance with the command value. For example, if the robot R is a six-axis articulated robot having six joints J, the FF torque calculating unit 14 transmits six FF torques $\tau_{r1}$ to $\tau_{r6}$ for the motors M1 to M6 of the six joints J1 to J6 on the first to sixth axes to the servo amplifiers SA1 to SA6 (described below).

Figure 5:
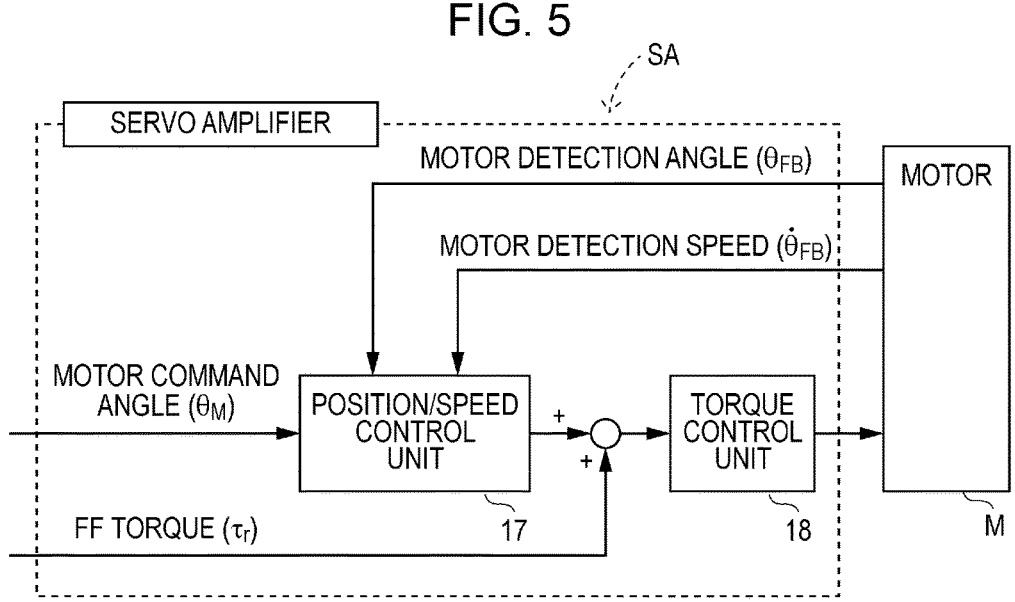
FIG. 5 is a block diagram illustrating a general configuration of a servo amplifier according to the present embodiment.
Figure 6A:
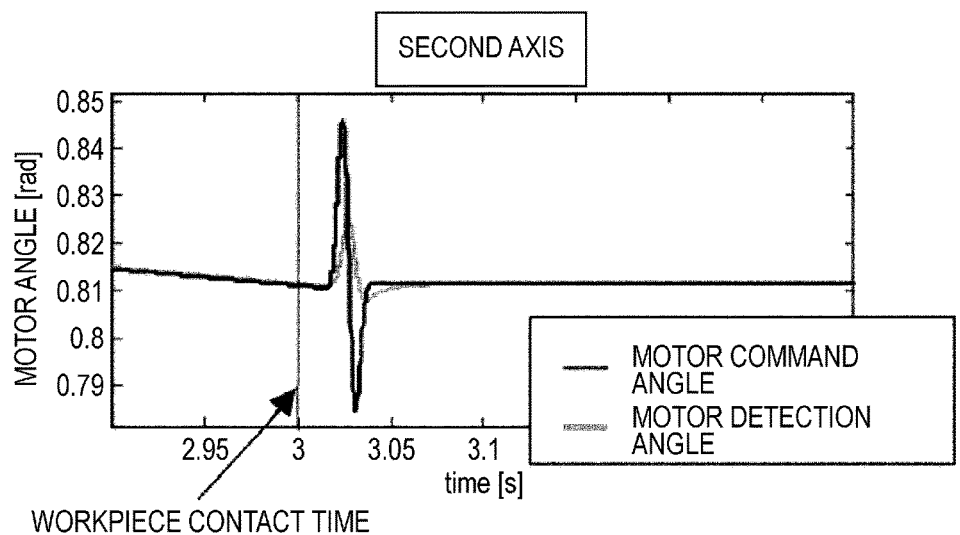
FIG. 6A is a graph showing how a motor on a second axis of the robot behaves when a control device according to the present embodiment (first embodiment) causes touch sensing to be performed.
Figure 6B:
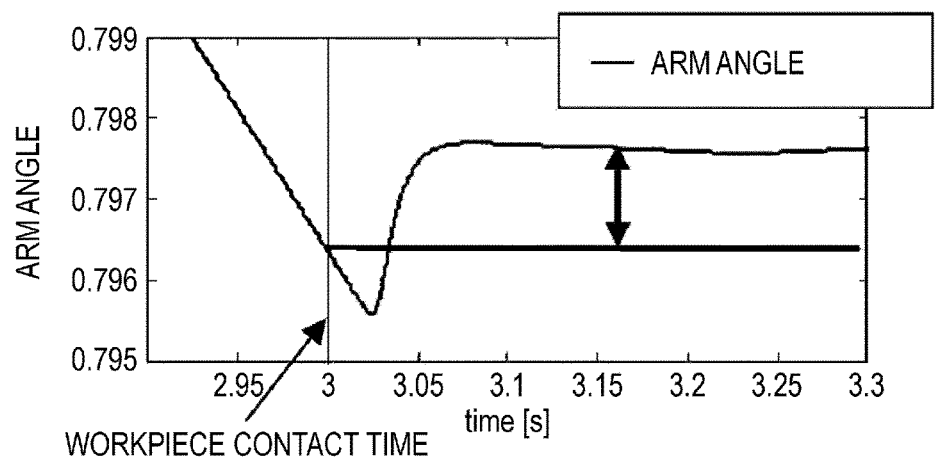
FIG. 6B is a graph showing how an arm on the second axis of the robot behaves when the control device according to the present embodiment (first embodiment) causes touch sensing to be performed.
Figure 6C:
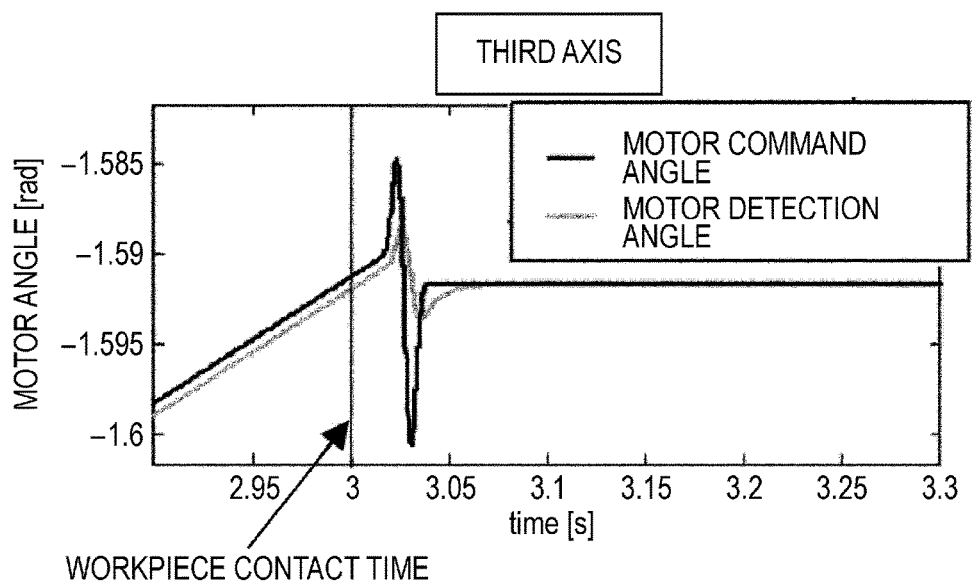
FIG. 6C is a graph showing how a motor on a third axis of the robot behaves when the control device according to the present embodiment (first embodiment) causes touch sensing to be performed.
Figure 6D:
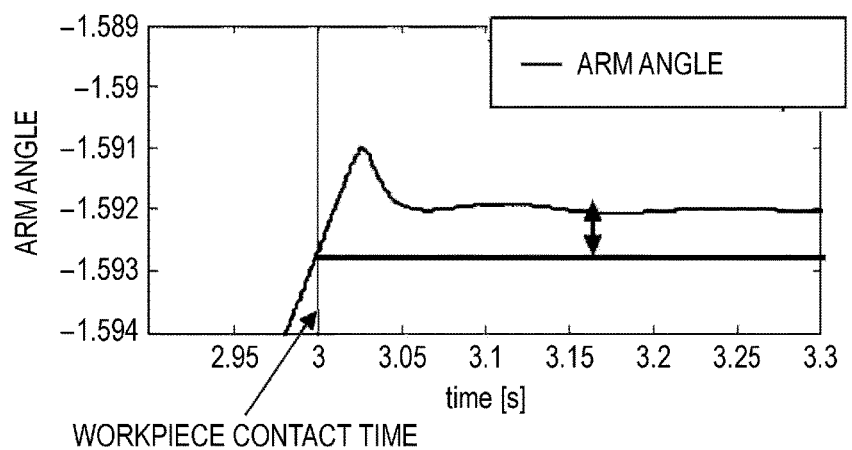
FIG. 6D is a graph showing how an arm on the third axis of the robot behaves when the control device according to the present embodiment (first embodiment) causes touch sensing to be performed.
Figure 7A:
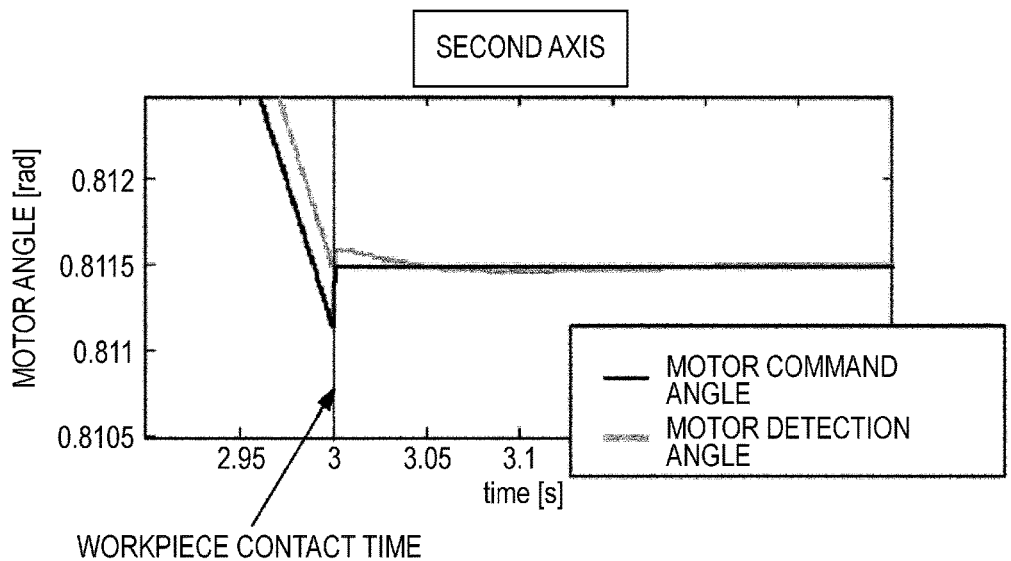
FIG. 7A is a graph showing how the motor on the second axis of the robot behaves when a control device without a stop position detecting unit and a command angle switching unit causes touch sensing to be performed.
Figure 7B:
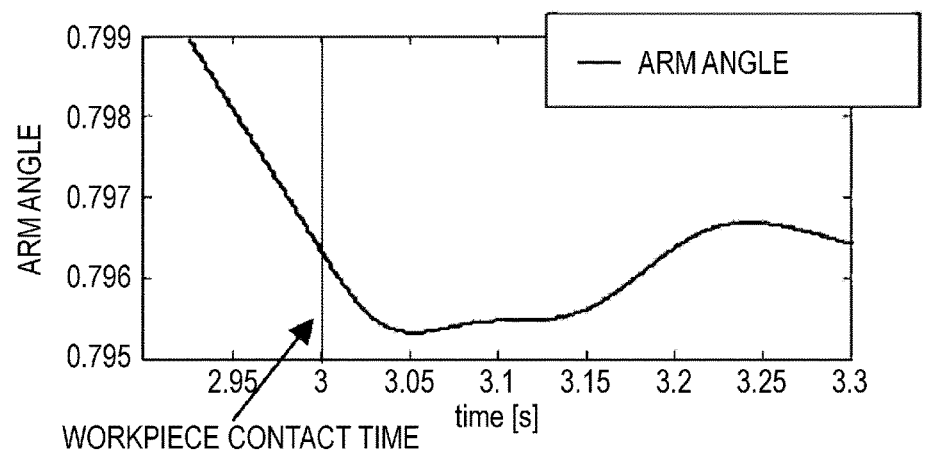
FIG. 7B is a graph showing how the arm on the second axis of the robot behaves when the control device without the stop position detecting unit and the command angle switching unit causes touch sensing to be performed.
Figure 7C:
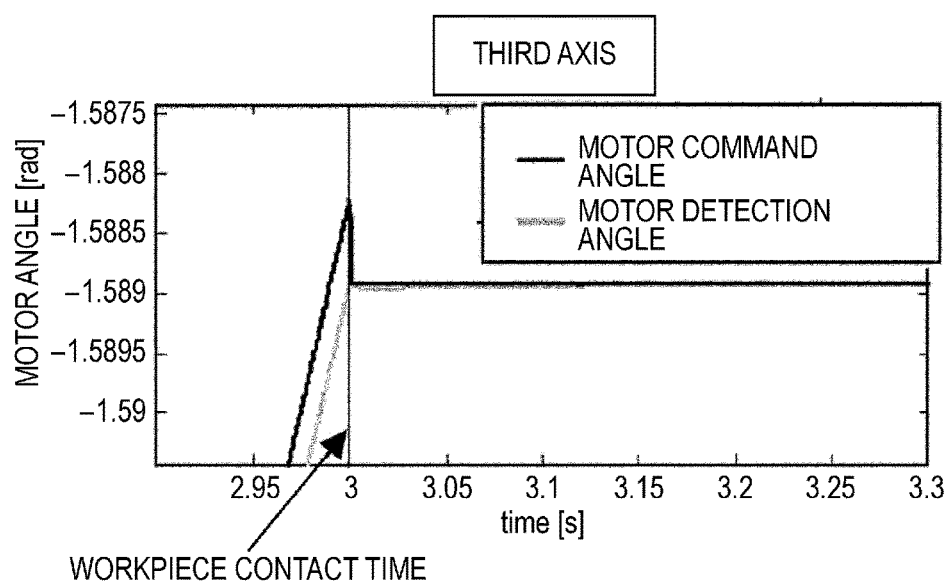
FIG. 7C is a graph showing how the motor on the third axis of the robot behaves when the control device without the stop position detecting unit and the command angle switching unit causes touch sensing to be performed.
Figure 7D:
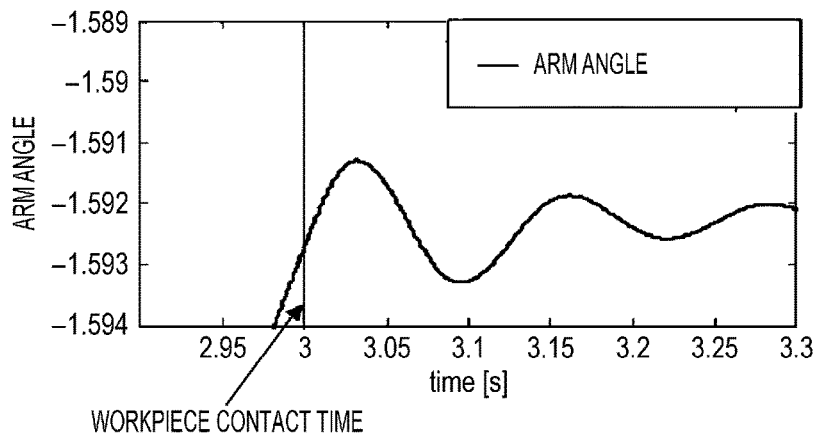
FIG. 7D is a graph showing how the arm on the third axis of the robot behaves when the control device without the stop position detecting unit and the command angle switching unit causes touch sensing to be performed.

The servo amplifier SA will now be described with reference to FIGS. 2 and 5. FIG. 5 is a block diagram illustrating an internal configuration of the servo amplifier SA. The servo amplifiers SA (SA1 to SA6) illustrated in FIG. 2 each have the configuration illustrated in FIG. 5.

The servo amplifier SA receives the motor command angle $\theta_M$ and the FF torque $\tau_r$, which are command values output from the higher-level controller C1, and operates the motor M in accordance with these command values. The servo amplifier SA includes a position/speed control unit 17 and a torque control unit 18. The servo amplifier SA is provided for each of the motors M (M1 to M6) on the first to sixth axes. For example, the servo amplifier SA1 provided for the motor M1 receives the motor command angle $\theta_{M1}$ and the FF torque $\tau_{r1}$, and operates the motor M1 in accordance with these received command values. Similarly, the servo amplifier SA2 provided for the motor M2 receives the motor command angle $\theta_{M2}$ and the FF torque $\tau_{r2}$, and operates the motor M2 in accordance with these received command values.

The position/speed control unit 17 of the servo amplifier SA outputs a torque command indicating a torque to be generated in the motor M, in accordance with the motor command angle $\theta_M$ output from the higher-level controller C1. Specifically, the position/speed control unit 17 mainly performs feedback processing, on the basis of the motor command angle $\theta_M$ calculated by the higher-level controller C1 and also a motor detection angle $\theta_{FB}$ and a motor detection speed d ($\theta_{FB}$) detected by an angle detector, such as an encoder mounted on the motor M. Then, the position/speed control unit 17 calculates, for example, a torque for operating a joint on the third axis of the robot R in accordance with the motor command angle $\theta_{M3}$.

The torque control unit 18 controls the motor M in accordance with a command value obtained by adding the FF torque $\tau_r$ to the torque command output from the position/speed control unit 17. Specifically, the torque control unit 18 adds the FF torque $\tau_r$ calculated by the higher-level controller C1 to the torque calculated by the position/speed control unit 17, and controls and operates the motor M such that a desired torque is generated.

The configuration of the higher-level controller C1 and the servo amplifier SA described above is a basic configuration of the control device 10 that controls the motion of the robot R according to the present embodiment. This motion control is characterized in that (1) elastic deformation compensation is performed to compensate for deflection in the joint J, and that (2) two-degree-of-freedom control is performed, in which a torque for operating the robot R in accordance with a command value is calculated on the basis of a kinetic model of the robot R.

With the two motion control operations described above, the control device 10 of the present embodiment can operate a complex mechanical body having a plurality of joints, such as the robot described above, in accordance with a command value, or, in other words, without vibration.

The motion control described above is effective only when the control device 10 operates the robot R in accordance with a command value based on predetermined or prestored motion information (teaching data). In a robot motion performed when there is no prestored motion information (teaching data) of the robot R and motion information (teaching data) is to be newly created, it is difficult for the control device 10 to operate, with only the configuration described above, the robot R in accordance with a command value.

Specifically, for the purpose of identifying the position and shape of a workpiece W (see FIG. 1) in the process of creating teaching data for a welding robot or the like, touch sensing is performed, in which the welding wire 2 of the welding torch 1 on the distal-end shaft of the robot R is moved until the welding wire 2 contacts the workpiece W. In the touch sensing, which is a robot operation widely known among those skilled in the art, the motion of the robot R needs to be immediately stopped at the position where the welding wire 2 contacts the workpiece W. When the robot R is thus abruptly stopped at a position not determined in advance, elastic deformation of the joint J causes the entire robot R to vibrate, particularly in the vicinity of the distal-end shaft on which the welding torch 1 is provided.

The control device 10 of the present embodiment includes the stop position detecting unit 15 and the command angle switching unit 16 as illustrated in FIG. 3. This is for the purpose of suppressing vibration of the robot R that occurs when the robot motion is abruptly stopped, even when the stop position is not determined in advance, such as in the case of touch sensing.

The stop position detecting unit 15 detects and outputs, as a motor detection angle, the angle of the motor M when the robot R contacts the workpiece W, which is an external structure. Specifically, when the welding wire 2 of the welding torch 1 contacts the workpiece W in touch sensing or the like, the stop position detecting unit 15 detects the motor detection angle $\theta_{FB}$ (motor detection angles $\theta_{FB1}$ to $\theta_{FB6}$) at the time of detection of the workpiece contact, and records the detected motor detection angle $\theta_{FB}$.

When the stop position detecting unit 15 outputs the angle of the motor M, the command angle switching unit 16 outputs the angle of the motor M detected by the stop position detecting unit 15 as a second angle command indicating the angle of the joint J, instead of the joint-angle command value $\theta_L$ output from the joint-angle command calculating unit 11. Specifically, the command angle switching unit 16 receives not only the joint-angle command value $\theta_L$ output by the joint-angle command calculating unit 11, but also the motor detection angle $\theta_{FB}$ detected by the stop position detecting unit 15. When workpiece contact is not detected, the command angle switching unit 16 outputs the joint-angle command value $\theta_L$. When workpiece contact is detected, the command angle switching unit 16 outputs the motor detection angle $\theta_{FB}$, instead of the joint-angle command value $\theta_L$, as the second angle command. Thus, the command angle switching unit 16 switches the joint-angle command value $\theta_L$ to the motor detection angle $\theta_{FB}$.

The joint-angle command value $\theta_L$ and the motor detection angle $\theta_{FB}$ output from the command angle switching unit 16 are subjected to processing performed by the axial-force torque calculating unit 12 and the elastic deformation compensation unit 13. Specifically, upon receipt of the motor detection angle $\theta_{FB}$, which is the second angle command, the axial-force torque calculating unit 12 calculates, as a second axial force torque, the torque $\tau_L$ generated on the joint axis of the robot R that operates in accordance with the received motor detection angle $\theta_{FB}$, on the basis of a kinetic model of the robot R. Then, the elastic deformation compensation unit 13 adds the torque $\tau_L$, which is the second axial force torque, and the amount of deflection in the joint J to the angle of the joint J indicated by the motor detection angle $\theta_{FB}$ received by the axial-force torque calculating unit 12 to calculate a motor command angle. The calculated motor command angle is output as the motor command angle $\theta_M$ to the servo amplifier SA, or is subjected to processing performed by the FF torque calculating unit 14 and output as the FF torque $\tau_r$ to the servo amplifier SA.

By controlling the motion of the robot R with the control device 10 including the higher-level controller C1 and the servo amplifier SA described above, it is possible to quickly stop the robot R without causing the robot R to vibrate in a motion which requires the robot R to be quickly stopped at a position not determined in advance, such as a robot motion for creating teaching data.

With reference to FIGS. 6A to 6D and FIGS. 7A to 7D, an advantageous effect of the control device 10 according to the present embodiment will be described. FIGS. 6A to 6D are graphs each showing how the motor M or arm on the second or third axis of the robot R behaves when the control device 10 according to the present embodiment causes touch sensing to be performed. FIGS. 7A to 7D are graphs each showing how the motor M or arm on the second or third axis of the robot R behaves when a control device without the stop position detecting unit 15 and the command angle switching unit 16 causes touch sensing to be performed.

FIGS. 6A to 6D show that when the control device 10 of the present embodiment is used, the arm angle does not significantly change (i.e., the arm remains stationary and does not vibrate) after 3.05 seconds, which is 0.05 seconds (s) from the workpiece contact time indicated by time 3 in seconds (s), on both the second and third axes. This means that the robot R can be quickly stopped without vibration.

On the other hand, FIGS. 7A to 7D show that when the control device 10 without the stop position detecting unit 15 and the command angle switching unit 16 is used, the arm angle significantly changes (i.e., the arm continues to vibrate) even after 3.05 seconds. This means that the robot R cannot be quickly stopped without vibration.

Second Embodiment

Figure 8:
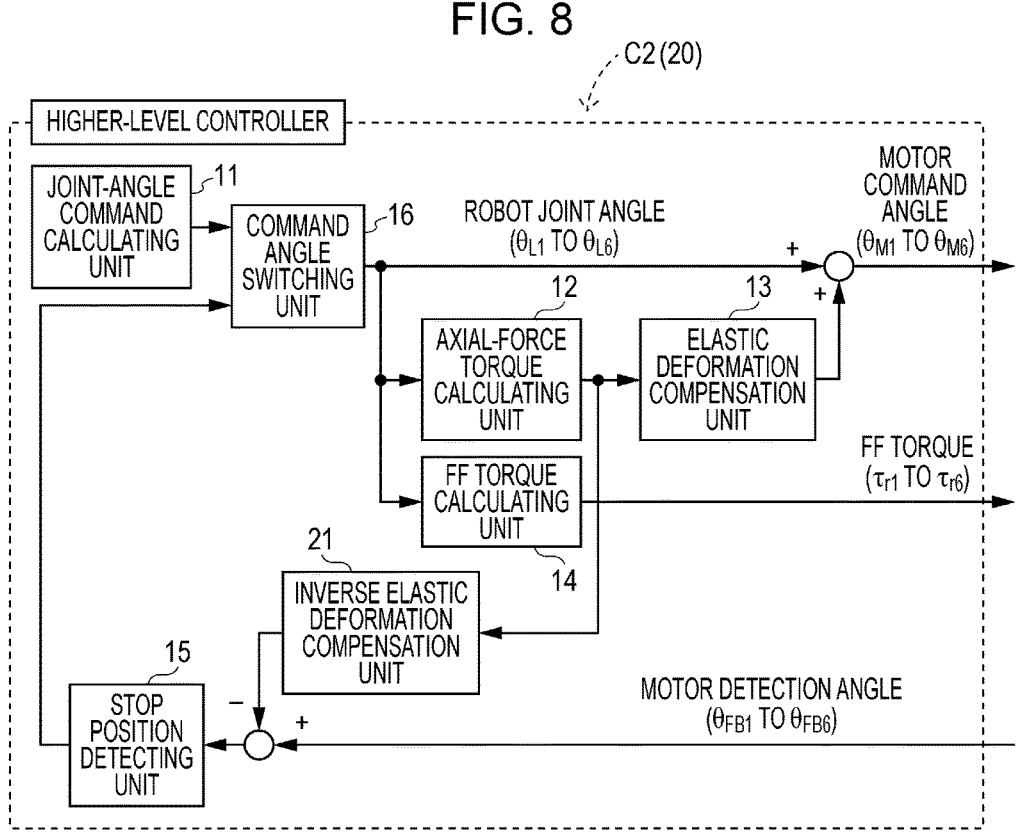
FIG. 8 is a block diagram illustrating a general configuration of a higher-level controller according to a second embodiment of the present invention.
Figure 9A:
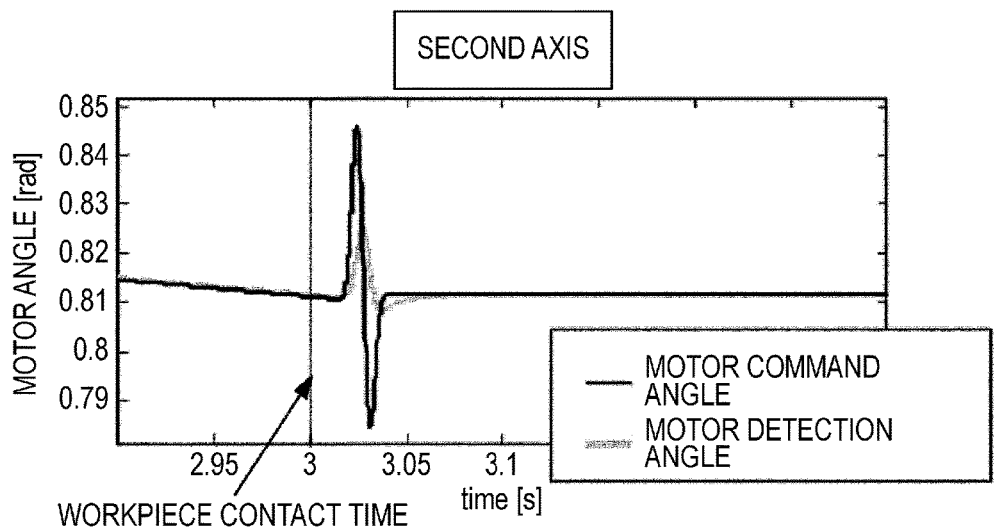
FIG. 9A is a graph showing how the motor on the second axis of the robot behaves when a control device according to the present embodiment (second embodiment) causes touch sensing to be performed.
Figure 9B:
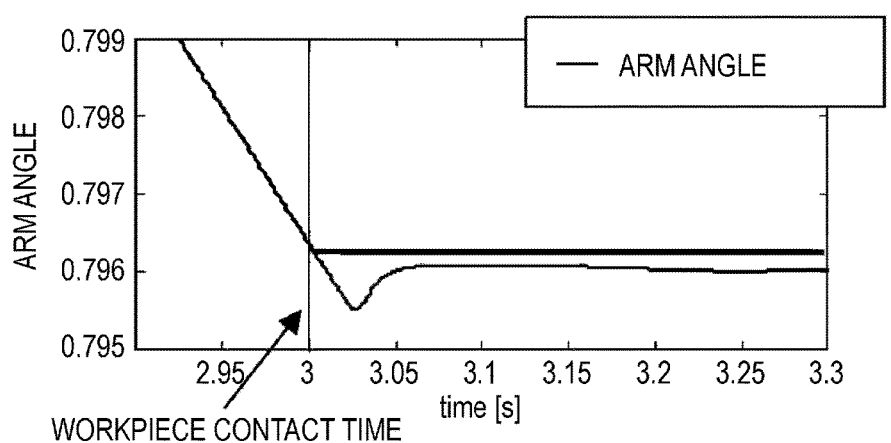
FIG. 9B is a graph showing how the arm on the second axis of the robot behaves when the control device according to the present embodiment (second embodiment) causes touch sensing to be performed.
Figure 9C:
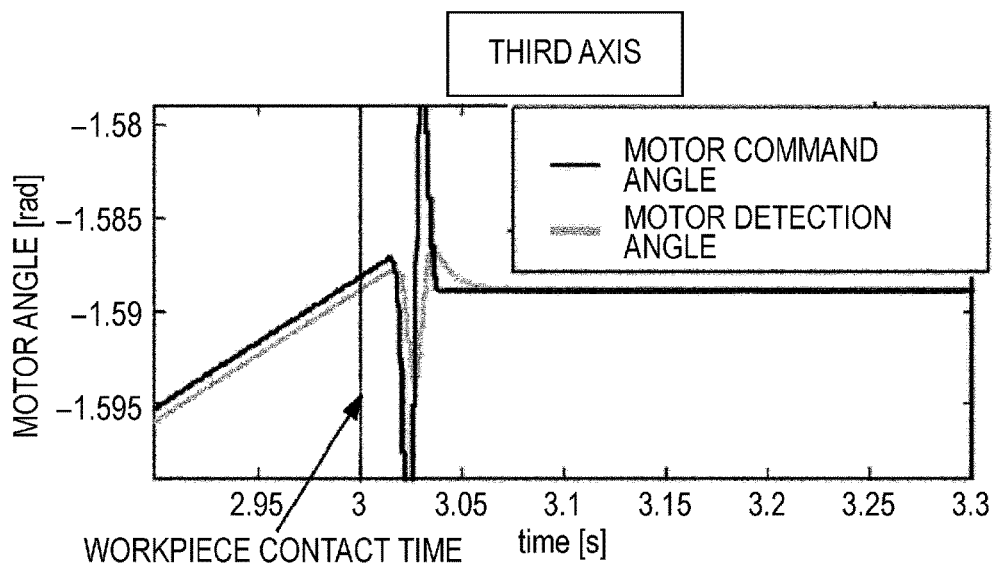
FIG. 9C is a graph showing how the motor on the third axis of the robot behaves when the control device according to the present embodiment (second embodiment) causes touch sensing to be performed.
Figure 9D:
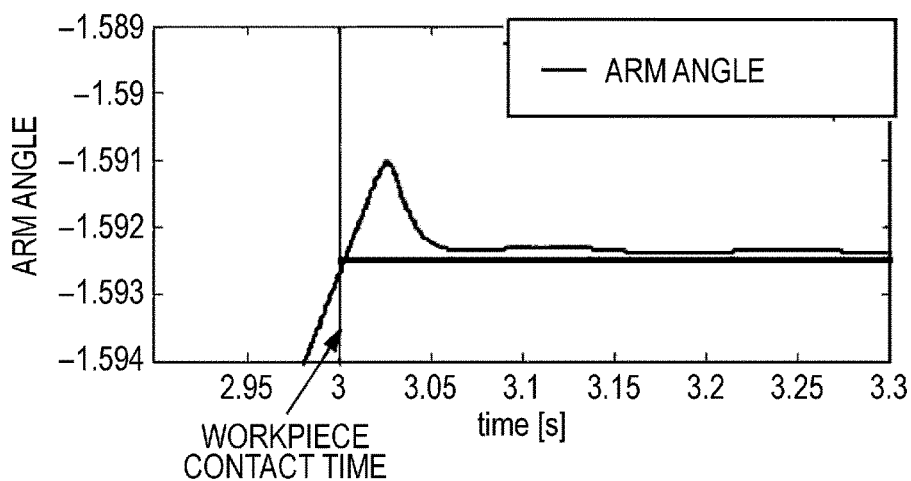
FIG. 9D is a graph showing how the arm on the third axis of the robot behaves when the control device according to the present embodiment (second embodiment) causes touch sensing to be performed.

With reference to FIG. 8 and FIGS. 9A to 9D, a control device 20 for the robot R according to a second embodiment of the present invention will be described. FIG. 8 is a block diagram illustrating a general configuration of a higher-level controller C2 according to the present embodiment.

The configuration of the control device 20 according to the present embodiment differs from that of the control device 10 according to the first embodiment in that the higher-level controller C2 corresponding to the higher-level controller C1 of the first embodiment includes an inverse elastic deformation compensation unit 21. The configuration other than the inverse elastic deformation compensation unit 21 is the same as that of the control device 10 according to the first embodiment. Therefore, the following description refers to the inverse elastic deformation compensation unit 21 and the advantage effect of the control device 20 achieved by including the inverse elastic deformation compensation unit 21.

Referring to FIGS. 6A to 6D described in the first embodiment, vibration caused by abrupt stopping is successfully suppressed on both the second and third axes. However, the arm angle after 3.05 seconds, that is, the robot stop position, is substantially away from the position at the time of workpiece contact indicated by a solid line. This is because the command angle switching unit 16 simply replaces the joint-angle command value $\theta_L$ with the motor detection angle $\theta_{FB}$ recorded at the time of workpiece contact.

That is, the robot joint angle is replaced by the motor detection angle recorded at the time of workpiece contact. Since the motor command angle $\theta_M$ is not equal to (≠) the robot joint angle as described in the first embodiment, simply replacing the joint-angle command value $\theta_L$ with the motor detection angle $\theta_{FB}$ causes displacement corresponding to the amount of deflection in the joint J.

The control device 20 of the present embodiment includes the inverse elastic deformation compensation unit 21 to solve the problem of displacement of the robot stop position from the position at the time of workpiece contact.

The inverse elastic deformation compensation unit 21 subtracts, from the motor detection angle $\theta_{FB}$, the amount of deflection in the joint calculated from the torque $\tau_L$ (first axial force torque or second axial force torque) output from the axial-force torque calculating unit 12 and a spring constant representing stiffness of the joint to calculate a corrected motor detection angle. Specifically, on the basis of the torque $\tau_L$ calculated by the axial-force torque calculating unit 12, the inverse elastic deformation compensation unit 21 corrects (subtracts) the motor detection angle $\theta_{FB}$ as indicated by the following equation (6) to newly create a corrected motor detection angle, and output it to the stop position detecting unit 15.

[Equation 6]

$$\tilde{\theta}_{FB} = \theta_{FB} - \tau_L/K \qquad \text{equation (6)}$$

$\tilde{\theta}_{FB}$: corrected motor detection angle
$\theta_{FB}$: motor detection angle
K: spring constant related to deflection in joint Then the stop position detecting unit 15 detects, records, and outputs the corrected motor detection angle, instead of the motor detection angle $\theta_{FB}$, and performs the same processing as in the first embodiment. The command angle switching unit 16 receives both the joint-angle command value $\theta_L$ output by the joint-angle command calculating unit 11 and the corrected motor detection angle detected by the stop position detecting unit 15, and performs the same operation as in the first embodiment.

A technical feature of the control device 20 according to the present embodiment is that the command angle switching unit 16 outputs the corrected motor detection angle, instead of the robot joint angle (joint-angle command value $\theta_L$). The corrected motor detection angle is obtained by the inverse elastic deformation compensation unit 21 by correcting the motor detection angle at the time of detection of workpiece contact.

That is, as described above, the elastic deformation compensation unit 13 of the present embodiment adds the amount of deflection in the joint J of the robot R to the joint angle indicated by the joint-angle command value $\theta_L$ received by the axial-force torque calculating unit 12, thereby compensating for the effect of elastic deformation in the robot R. This compensation makes it possible to suppress vibration caused by abrupt stopping of the robot R. However, the compensation performed by the elastic deformation compensation unit 13 works even after the stopping, and the robot R stops at a certain distance from the position at the time of workpiece contact.

Accordingly, the inverse elastic deformation compensation unit 21 having a feature completely opposite the feature of the elastic deformation compensation unit 13 is prepared. Thus, the corrected motor detection angle obtained by correction performed by the inverse elastic deformation compensation unit 21, instead of the robot joint angle, is output from the command angle switching unit 16 to cancel out the compensation made by the elastic deformation compensation unit 13 after stopping of the robot R.

Therefore, by controlling the motion of the robot R with the higher-level controller C2 including the inverse elastic deformation compensation unit 21, the control device 20 of the present embodiment can quickly and accurately stop the robot R at a desired stop position (near the position at the time of workpiece contact) without causing the robot R to vibrate, in a motion which requires the robot R to be quickly stopped at a position not determined in advance, such as a robot motion for creating teaching data. It is thus possible to solve the problem of displacement of the robot stop position from the position at the time of workpiece contact.

With reference to FIGS. 9A to 9D, an advantageous effect of the control device 20 according to the present embodiment will be described. FIGS. 9A to 9D are graphs each showing how the motor M or arm on the second or third axis of the robot R behaves when the control device 20 according to the present embodiment causes touch sensing to be performed.

FIGS. 9A to 9D show that when the control device 20 of the present embodiment is used, the arm angle does not significantly change (i.e., the arm remains stationary and does not vibrate) after 3.05 seconds, which is 0.05 seconds (s) from the workpiece contact time indicated by time 3 in seconds (s), on both the second and third axes. This means that the robot R can be quickly stopped without vibration. Additionally, the robot stop position is substantially equal to the position at the time of workpiece contact indicated by a solid line. This means that there is little displacement of the robot stop position from the position at the time of workpiece contact.

The embodiments disclosed herein are illustrative in all respects, and should not be considered restrictive. The scope of the present invention is defined by the appended claims, not by the foregoing description, and is intended to include meanings equivalent to the appended claims and all modifications within the scope. Particularly, in the embodiments disclosed herein, matters that are not explicitly disclosed, such as operating conditions, various parameters, and dimensions, weights, and volumes of components, are given by values that are within ranges generally employed by those skilled in the art and that can be easily conceived by those skilled in the art.

The present application is based on Japanese Patent Application No. 2014-114086 filed on Jun. 2, 2014, the contents of which are incorporated herein by reference.

REFERENCE SIGNS LIST 10, 20: control device
11: joint-angle command calculating unit
12: axial-force torque calculating unit
13: elastic deformation compensation unit
14: FF torque calculating unit
15: stop position detecting unit
16: command angle switching unit
17: position/speed control unit
18: torque control unit
21: inverse elastic deformation compensation unit
J: joint
M: motor
R: welding robot (robot)
W: workpiece (external structure)
C1, C2: higher-level controller
SA: servo amplifier

The invention claimed is:

1. A robot control device that controls an angle of a joint of a robot driven by a motor, the robot control device comprising:
a joint-angle command calculating unit configured to calculate and output a first angle command indicating an angle of the joint for causing the robot to perform a desired motion;
an axial-force torque calculating unit configured to calculate, upon receipt of the first angle command, a first axial force torque on the basis of a kinetic model of the robot, the first axial force torque being generated on a joint axis of the robot operating in accordance with the received first angle command;
an elastic deformation compensation unit configured to add the amount of deflection in the joint calculated from the first axial force torque and a spring constant representing stiffness of the joint of the robot to the angle of the joint indicated by the first angle command received by the axial-force torque calculating unit, to calculate and output a motor command angle indicating a rotation angle of the motor;
a stop position detecting unit configured to detect and output, as a motor detection angle, an angle of the motor when the robot contacts an external structure; and
a command angle switching unit configured to output, when the stop position detecting unit outputs the angle of the motor, the angle of the motor detected by the stop position detecting unit as a second angle command indicating the angle of the joint, instead of the first angle command output from the joint-angle command calculating unit.

2. The robot control device according to claim 1, wherein, upon receipt of the second angle command, the axial-force torque calculating unit calculates a second axial force torque on the basis of the kinetic model of the robot, the second axial force torque being generated on the joint axis of the robot operating in accordance with the received second angle command; and
the elastic deformation compensation unit adds the second axial force torque and the amount of deflection in the joint to the angle of the joint indicated by the second angle command received by the axial-force torque calculating unit to calculate the motor command angle.

3. The robot control device according to claim 2, further comprising an inverse elastic deformation compensation unit configured to subtract, from the motor detection angle, the amount of deflection in the joint calculated from the first or second axial force torque output from the axial-force torque calculating unit and the spring constant representing stiffness of the joint to calculate a corrected motor detection angle,
wherein the stop position detecting unit detects and outputs the corrected motor detection angle, instead of the motor detection angle.

4. The robot control device according to claim 1, further comprising:
an FF torque calculating unit configured to calculate, upon receipt of the first angle command, an FF torque on the basis of kinetic models of the robot and the motor, the FF torque being generated in the motor when the joint operates in accordance with the first angle command;
a position/speed control unit configured to output, in accordance with the output motor command angle, a torque command indicating a torque to be generated in the motor; and
a torque control unit configured to control the motor in accordance with a command value obtained by adding the FF torque to the torque command output from the position/speed control unit.

5. The robot control device according to claim 2, further comprising:
an FF torque calculating unit configured to calculate, upon receipt of the first angle command, an FF torque on the basis of kinetic models of the robot and the motor, the FF torque being generated in the motor when the joint operates in accordance with the first angle command;
a position/speed control unit configured to output, in accordance with the output motor command angle, a torque command indicating a torque to be generated in the motor; and
a torque control unit configured to control the motor in accordance with a command value obtained by adding the FF torque to the torque command output from the position/speed control unit.

6. The robot control device according to claim 3, further comprising:
- an FF torque calculating unit configured to calculate, upon receipt of the first angle command, an FF torque on the basis of kinetic models of the robot and the motor, the FF torque being generated in the motor when the joint operates in accordance with the first angle command;
- a position/speed control unit configured to output, in accordance with the output motor command angle, a torque command indicating a torque to be generated in the motor; and
- a torque control unit configured to control the motor in accordance with a command value obtained by adding the FF torque to the torque command output from the position/speed control unit.

* * * * *